Nov. 29, 1938.    J. S. REID    2,138,710
TRIM MOLDING AND METHOD OF MAKING THE SAME
Filed April 12, 1938    4 Sheets-Sheet 1
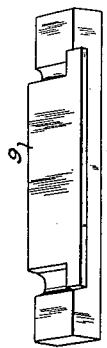
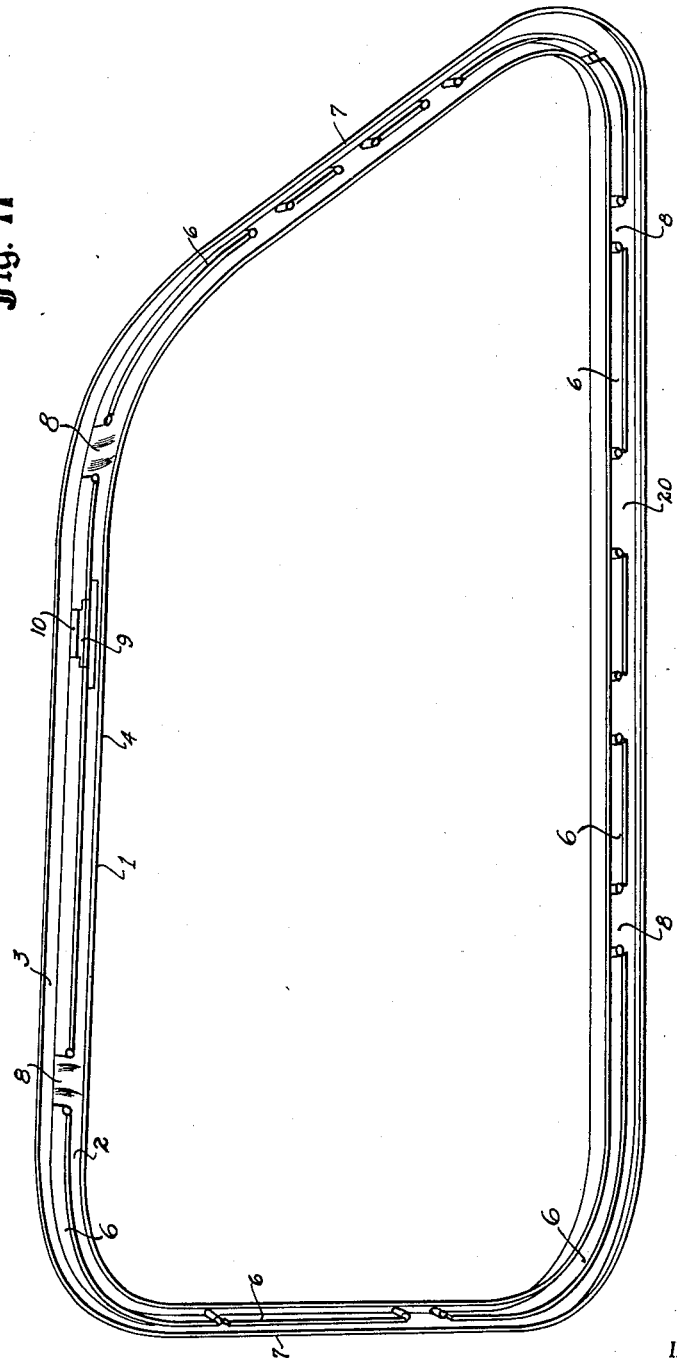
INVENTOR.
JAMES S. REID
BY
ATTORNEY.

Nov. 29, 1938.  J. S. REID  2,138,710
TRIM MOLDING AND METHOD OF MAKING THE SAME
Filed April 12, 1938  4 Sheets-Sheet 2
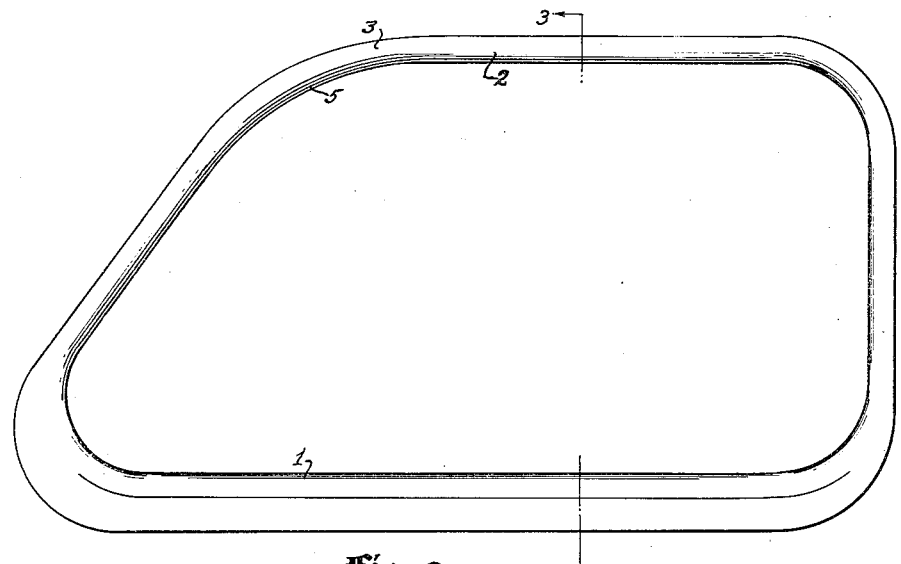
Fig. 2
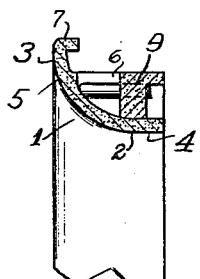
Fig. 3
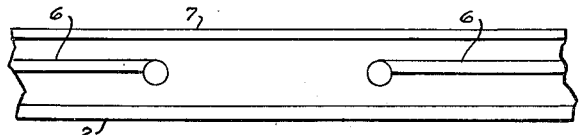
Fig. 4
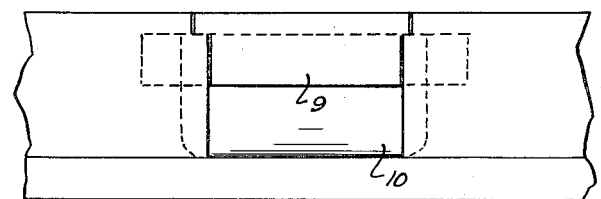
Fig. 6
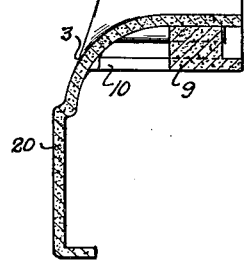
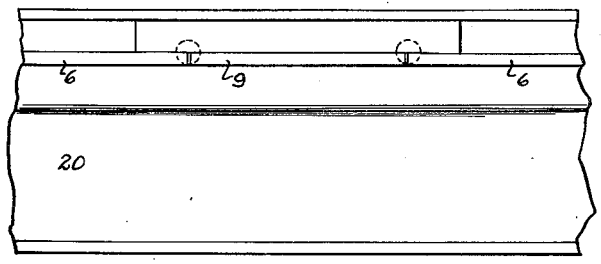
Fig. 5
INVENTOR.
JAMES S. REID
BY John H. Leonard,
his ATTORNEY.

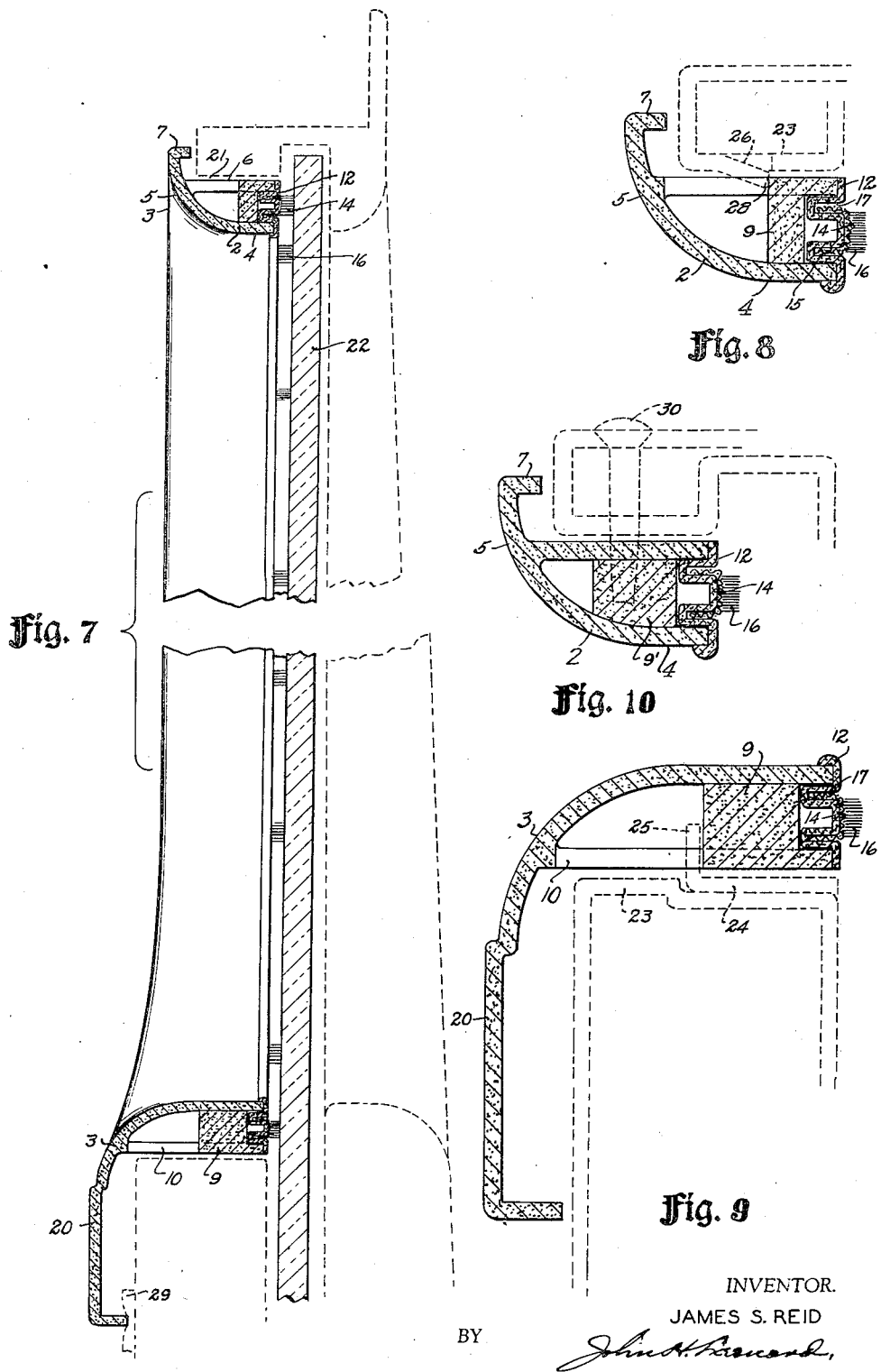

Nov. 29, 1938.   J. S. REID   2,138,710
TRIM MOLDING AND METHOD OF MAKING THE SAME
Filed April 12, 1938   4 Sheets-Sheet 4
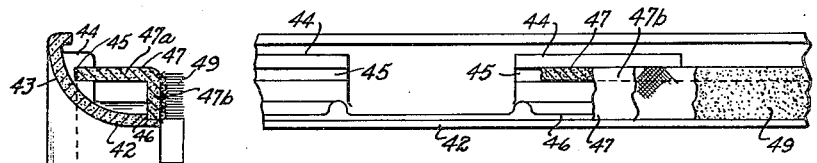
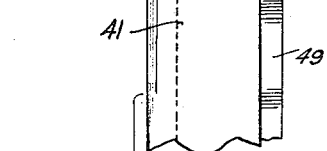
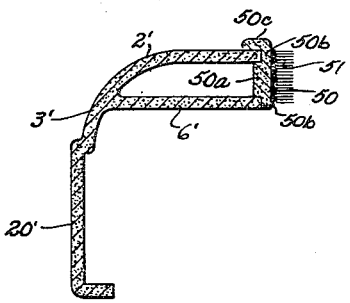
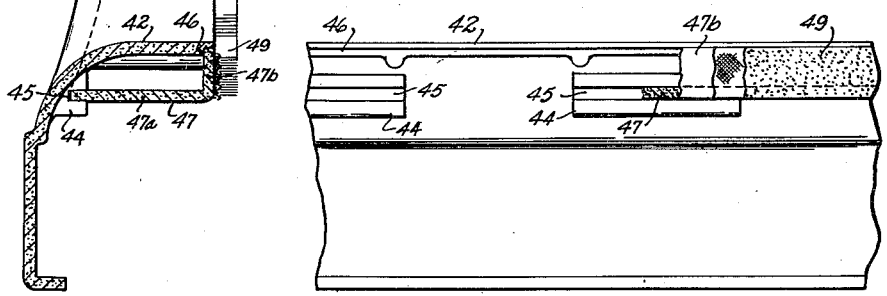
INVENTOR.
JAMES S. REID
BY
ATTORNEY.

Patented Nov. 29, 1938

2,138,710

UNITED STATES PATENT OFFICE 2,138,710

TRIM MOLDING AND METHOD OF MAKING THE SAME

James S. Reid, Shaker Heights, Ohio, assignor to Thermo-Plastics, Inc., St. Clair, Mich., a corporation of Michigan Application April 12, 1938, Serial No. 201,469

11 Claims. (Cl. 296—44)

This invention relates to trim molding and particularly to trim molding for vehicle walls having window openings therein and windows slidably adjustable in the wall structure for opening and closing the openings.

One of the principal objects of the present invention is to provide a decorative trim molding for the openings in such wall structures and which is formed essentially of thermally moldable material, such as cellulose organic acid esters.

Another object is to provide a trim molding having relatively thin walls but so reinforced that it may be handled and installed readily as a unitary structure.

Another object is to provide a trim molding of this character which has suitable yieldable window-seal material carried directly by the molding as a pre-attached portion thereof and positioned so that the seal material engages the window pane when the trim molding is installed, as a unitary structure, in the opening.

Another object is to provide a trim molding of this character which is complete in itself and forms essentially a unitary structure which can be placed readily in the opening and in which provision is made for ease in securing the trim molding in position within the opening by suitable attachment means.

Another object is to provide a trim molding of thermoplastic cellulose acetate material which is arranged to extend generally peripherally of the opening, and which has inner and forward decorative faces arranged to conceal those edges of the wall which define the opening and to overlie the forward portion of the wall adjacent to the opening, and which has attachment portions so arranged that the attachment portions and cooperating attachment means are concealed by the trim molding when the molding is mounted within the opening.

A more specific but equally important object is to provide a trim molding comprising essentially a thin walled peripherally enclosed member of cellulose organic acid ester material having integral forward and inner walls and with a rearwardly extending reinforcement cooperating with said walls to form a substantially boxlike reinforcement arranged to fit within an opening of a wall structure, and with the walls of the molding overlying and concealing the wall structure adjacent to the opening, concealing the reinforcement, and concealing those edges of the wall structure which define the opening.

Another specific object is to provide a trim molding of the character described immediately above and which is complete within itself, requires no finishing operations on the decorative forward and inner surfaces, and which is provided on its rear portions with a yieldable sealing material arranged to engage a window pane in the opening when the trim molding is installed and secured in place within the opening.

Another object is to provide a trim molding comprised primarily of thermally moldable cellulose acetate material and so shaped that the material can be used to advantage economically by reducing the amount required and the amount of "first run" material necessary.

Another object is to provide an efficient method of making of thermally moldable material a decorative trim molding which has relatively thin walls and yet is reinforced in a manner such that it has adequate strength for its intended uses.

Other objects and advantages will become apparent from the following specification, in which reference is made to the drawings, in which—

Figure 1 is a perspective view of a preferred form of trim molding embodying the principles of the present invention, the trim molding being viewed generally from the rear;

Figure 2 is a reduced front elevation of the trim molding illustrated in Figure 1;

Figure 3 is a cross-sectional view of the trim molding, taken on a plane indicated by the line 3—3 of Figure 2;

Figure 4 is a full size, fragmentary, rear elevation of a portion of the upper part of the trim molding illustrated in Figures 2 and 3;

Figure 5 is a full size, fragmentary, rear elevation of the lower part of the trim molding illustrated in Figures 2 and 3;

Figure 6 is a full size, fragmentary, bottom plan view of the trim molding illustrated in Figures 2 and 3, as viewed from the bottom of Figure 3;

Figure 7 is a view similar to Figure 3 showing the completed trim molding including the reinforcing means and window-seal, and attached to the wall structure of an automobile body, the body wall structure being shown in dotted lines;

Figures 8 and 9 are enlarged sectional views of the top and bottom portions, respectively, of the trim molding and supporting structure illustrated in Figure 7;

Figure 10 is an enlarged sectional view, similar to Figure 8, showing a modified attachment means securing the trim molding to the wall structure;

Figure 11 is an enlarged perspective view of an attachment block for the trim molding;

Figure 12 is a fragmentary sectional view, similar to Figure 7, showing a modification of the structure of the trim molding;

Figures 13 and 14 are fragmentary rear elevations of the top and bottom portions, respectively, of the trim molding illustrated in Figure 12; and Figure 15 is a sectional view, similar to Figure 9, illustrating another modification of the invention.

The preferred form of the trim molding, as herein disclosed, preferably is formed of cellulose organic acid esters such as cellulose acetate. Throughout the description and claims, the terms "peripherally extending" and "extending peripherally" are used to designate members or portions which extend, either all or partway around that portion of the wall structure defining an opening, and do not necessarily require that the members or portions so designated be peripherally closed or continuous.

Referring first to Figures 1 to 11, inclusive, there is illustrated a preferred embodiment of the present trim molding which comprises a peripherally extending member 1 which may extend entirely around an opening in a wall structure and thus is closed peripherally. The member 1 has an inner wall portion 2, that is, a wall portion which faces inwardly of the opening, and a forward wall portion 3, these wall portions preferably merging with each other on a gradual curve and presenting a continuous rounded wall having an inner decorative face 4 and a forward decorative face 5.

Extending rearwardly from the forward wall portion 3 is an outer flange member 6 which is preferably integral with the member 1. The flange member 6 may be substantially co-extensive with and generally parallel to the wall portion 2 and is spaced outwardly from the wall portion 2 and inwardly from the peripheral portion 7 of the forward wall portion 3. Thus the flange member 6 defines, with the wall portions 2 and 3, a rearwardly open channel section, as illustrated in Figures 1 and 3.

The integral flange member 6 preferably has provided, at points spaced along the member 1, a plurality of notches 8 which extend from a location at or closely adjacent to the forward wall portion 3 rearwardly and open through the rear edge of the flange member 6. Interposed between the flange member 6 and the wall portion 2, adjacent the notches 8, are attachment blocks 9. The blocks 9 are concealed when the trim molding is installed and consequently preferably are of second run or reconditioned thermally moldable material which is considerably less expensive than the new material used for the exposed portions of the molding. The blocks 9 are preferably arranged to lie between the wall portion 2 and flange member 6 and to bridge from one to the other and to bridge across the rearward portion of the associated notches 8 and are cemented in place by acetone or other suitable cement. The blocks 9 define between their forward ends and the forward wall portion 3, suitable peripherally closed openings 10.

As better illustrated in Figure 7, suitable reinforcing elements, or a single element, 12 are provided, these elements having portions secured between the rear margins of the flange member 6 and the wall portion 2 and fixedly attached to both so as to form with the flange member 6, wall portion 2, and a portion of the forward wall 3, a rigid boxlike reinforcement. The reinforcing elements 12 also have portions overlying the free edges of the flange member 6 and wall portion 2. The elements 12 may be formed of "second run" or reconditioned thermally moldable material, or of metal, as desired, and secured fixedly in place at all points of contact by acetone cement.

Secured to the reinforcing element or elements 12 so as to be exposed rearwardly of the trim molding is yieldable window-seal material 14, this material, as better illustrated in Figure 8, preferably comprising a fabric backing strip 15 with loose fibers or pyle 16 extending from the rear face of the fabric 15. In the form illustrated in Figure 7, the reinforcing element 12 is so shaped so as to provide lateral grooves 17, these grooves being arranged to receive the lateral margins of the fabric 15. In those cases in which the reinforcing element or elements 12 are of thermally moldable material, the fabric or other window-seal material may be affixed rigidly thereto by the application of acetone between the fabric and the rear face of the reinforcing element. If, however, the reinforcing element is metal, other cement may be used, or mechanical attachment only relied on, if desired.

In the preferred form of the invention, both the member 1 and its wall portion 2 and the flange member 6 are substantially continuous and peripherally closed. In such instances, the reinforcing element 12 likewise may be peripherally continuous or closed.

As described, the flange member 6 is spaced outwardly from the inner wall portion 2 and inwardly from the outer peripheral portion 7 of the wall portion 3 so that, when the reinforcement, and particularly the flanged member 6, is received within the opening of the wall structure, the flange member 6 and the reinforcement conceal those edges of the wall structure which define the opening and are themselves concealed by the wall portions 2 and 3. The wall portion 3 extending outwardly beyond the flange member 6 is arranged to overlie the forward face of the wall structure adjacent the opening and thus conceal the marginal limits of the wall adjacent the wall opening.

At the lower portion of the trim molding it is desirable to extend the forward wall portion 3 downwardly to provide a decorative guard of appreciable dimension. Such guard is indicated at 20 and is integral with the wall portion 3 and arranged to overlie the wall structure adjacent the opening.

Referring to Figure 7, the trim molding is shown in connection with an automobile body wall structure indicated in Figure 7 in dotted lines. In this combination, the window opening designated generally as 21, is arranged to accommodate a window pane 22, which is slidably movable vertically to different adjusted positions. The trim molding is so arranged that the reinforcement heretofore described fits snugly within the opening 21 with the pyle 16 of the window-seal strip bearing against the forward or adjacent face of the window pane 22. As better illustrated in Figures 8 and 9, the vehicle wall structure includes a metal member 23. At the portion of the wall structure defining the lower limit of the opening, there is provided an attachment 24 which is preferably in the form of an L, one portion lying along the upper surface of the member 23 and the other portion, designated at 25, extending upwardly therefrom in the form of a hook. At the portion of the member 23 defining the upper limit of the opening 21, small rearwardly sloping tongues 26 are provided by slitting the metal of the wall 23 at two sides and the end of the particular tongue and bending the tongue slightly downwardly rearwardly.

With this arrangement, the trim molding may be installed by first placing the lower portion in the opening of the wall structure and causing the hooks 25 to pass into the openings 10 in the trim molding and engage the forward surface of the blocks 9, respectively. Thereupon, the trim molding is swung upwardly and rearwardly about its lower portion and the upper portion of the molding is pressed into the opening 21, causing the tongues 26 to pass over the blocks 9 and spring back against the forward faces of the blocks 9, as indicated at 28, thus anchoring or securing the trim molding in the opening 21 with the window seal bearing against or substantially engaging the window pane 22. Usually the depth of the molding, forwardly and rearwardly, is such that when it is installed in this position, the margin of the front wall portion 3 bears firmly against and slightly compresses the fabric lining of the automobile wall structure, as indicated at 29.

Instead of the attachment means illustrated in Figures 8 and 9, the trim molding may be secured in place, as illustrated in Fig. 10, by passing suitable screws 30 through the automobile wall structure from the outside, these screws being screwed into the blocks, indicated at 9' in Figure 10 and corresponding to the blocks 9 heretofore described. Other suitable attachment means may be used. Thus, portions are provided on the trim molding for engagement with attachment means for securing the molding in position in the opening of a wall structure.

Referring next to Figures 12 to 14, inclusive, a modification of the trim molding is illustrated and comprises a trim molding 41 corresponding generally to the trim molding heretofore described and having an inner wall 42 and a forward wall 43 integral therewith, the exposed surfaces of said walls being decorative for the purposes heretofore described. Instead of the flange member 6, however, there is provided on the rear face of the forward wall a series of suitable peripherally extending protuberances 44 which have notches 45 therein which open rearwardly of the trim molding 41. The inner wall 42 is provided with a slight inset in its outer face near its rear margin, thus providing a shoulder 46. A suitable flange 47, which may be of reconditioned thermoplastic material, or metal, as desired, is next provided, this member preferably having angularly disposed portions 47a and 47b. The forward end of the portion 47a of the member 47 is seated and cemented in the groove 45 and the portion 47a is seated and cemented on the shoulder 46. Thus, the portions of the flange member 47 and the forward wall 43 and the inner wall 42 provide a box-like reinforced section extending rearwardly from the forward wall of the trim molding, in the same manner as the box-like reinforcing portion provided by the integral flange 6, inner wall 2 and forward wall 3 heretofore described. Suitable resilient window seal material, such as indicated at 49, is secured to the portion 47b of the flange member 47 so as to be exposed in position to engage the window pane when the trim molding is installed.

Referring next to Figure 15, there is illustrated a modification wherein a different reinforcing strip than that described in connection with Figures 1 to 11 is provided. The molding structure itself is similar to that disclosed in Figures 1 to 11, the parts in Figure 15 corresponding to those in Figures 1 to 11 being designated by corresponding primed numerals. Instead of the reinforcing element 12, a reinforcing element 50 is provided. The element 50 may be metal or thermally moldable material, but is preferably of the latter. The member 50 is provided with a centrally thickened portion 50a arranged to fit snugly between the wall 2' and the flange 6'. The marginal portions 50b of the element 50 are arranged to overlie the rear or free edges of the wall 2' and flange 6', respectively. The element 50 is provided also with an outwardly extending flange portion 50c which, when the element 50 is installed, as illustrated in Figure 15, overlies the rearward margin of the inner face 2'. The element 50 preferably is made of a material contrasting in color and appearance to the wall 2' so as to form a contrasting bead or edging at the rearward limit of the wall 2'. Suitable resilient window seal material 51 is cemented to the rear face of the reinforcing element 50 so as to engage the window pane when the trim member is installed as heretofore described. Thus, the element 50 in itself comprises a trim molding as well as a reinforcing element.

As heretofore described, the trim molding is preferably formed by injection molding of thermoplastic material such as cellulose organic acid ester material with the desired coloring ingredients. This injection molding accomplished preferably in accordance with the process defined in United States Letters Patent No. 2,043,584, issued June 9, 1936, to Harry A. Husted. However, if desired, depending upon the material used, the trim molding may be formed by other methods, though the results obtained are not as satisfactory. Likewise, the trim molding is preferably molded in one piece, the only addition necessary after the molding operation being the installation of the reinforcing element 12 and the blocks 9, as desired. For this purpose, the trim molding illustrated in Fig. 1 is positioned with its open rear portion upwardly. The blocks 9 are then dipped in or brushed with acetone and inserted. Next, the element 12 is brushed or dipped in acetone and pressed into place, the weather seal material having first been affixed thereto.

The trim molding is molded in a finished mold such that the inner surface 4 and the forward surface 5 require no finishing operation after completion. However, while certain advantages are obtained by forming the trim molding in substantially one piece which is peripherally closed or continuous, it is not intended that the present invention is to be limited to the formation of the molding in one piece which is peripherally closed, but it is to include a molding which may be made in peripherally extending portions which, when subsequently secured together, may form a peripherally closed molding or extend entirely around the wall opening. Again, the molding may be formed in sections and mounted in the wall structure without securing them together at the ends or without carrying the molding entirely around the opening.

The finished garnish molding described has structural differences and operative characteristics which are not present in prior moldings. For example, the granular structure of the molding is homogeneous throughout the full wall thickness, the molding is tough and compact and has great depth of color and decorative characteristics which extend for the full wall thickness instead of being dependent upon a mere surface film as in the case of phenolic condensation products. Due to the homogeneity and these other characteristics, defacement of the surface may be rendered unnoticeable merely by polishing down the original surface to the necessary degree and without the addition of other agents. A molding of the material described affords an unlimited range of color and variegated color effects. Again, the molding is strong, light, flexible and resilient to such a degree that it may be forced easily into the opening with which it is to be associated even though the opening does not conform accurately to the shape for which the molding was designed. When so stressed and forced into the opening the molding adjusts itself to manufacturing irregularities of the opening without danger of breakage during either installation or use.

It is apparent from the foregoing description that, in accordance with the present invention, the peripherally extending decorative trim molding arranged to fit within a wall opening and to overlie the portions of the wall structure adjacent to the opening and having a concealed reinforcement extending rearwardly therefrom and fitting within the limits of the opening and assisting in centering the molding in the opening is provided.

Having thus described my invention, I claim:

1. A decorative trim molding for a wall structure having an opening and comprising a thin-walled member of cellulose organic acid ester material, said material having decorative characteristics for its full thickness, and said member being arranged to extend peripherally of the opening and having a forward wall and an inner wall integral therewith, said walls having integral forward and inner decorative surfaces, respectively, a box-like reinforcing structure extending rearwardly from the forward wall and spaced inwardly from the periphery of the forward wall and outwardly from said inner decorative surface, said box-like structure being arranged for fitting within said opening with the peripheral margin of the said forward wall overlying the said wall structure adjacent to the opening, and said box-like structure having portions for receiving attachment means for connecting the trim molding to said wall structure.

2. A trim molding for a wall structure having an opening, comprising a member of thermally moldable material arranged to extend peripherally of the opening and having integral forward and inner walls with forward and inner integral decorative surfaces, respectively, a flange member integral with the forward wall and extending rearwardly therefrom in outwardly spaced relation to the said inner wall and defining with a portion of the first member a rearwardly open channel, and rigid reinforcing elements disposed between the flanged member and said inner wall and spaced from each other lengthwise of the molding and means connected to the members and closing said channel and forming therewith a rigid box-like reinforcement adapted for reception in said opening.

3. A trim molding for a wall structure having an opening and comprising a thin-wall member of cellulose organic acid ester material arranged to extend peripherally of the opening, and having an inner wall portion and a forward wall portion merging therewith, said wall portions having decorative inner and forward surfaces, respectively, merging with each other, a separate flange member having different physical characteristics from those of the first named member, connected to the latter and extending rearwardly from the forward wall portion and in spaced relation outwardly from said inner wall portion and generally parallel thereto, said flange member being spaced inwardly from the periphery of the first member and arranged to lie within said opening with the peripheral margin of the forward wall portion overlying the said wall structure adjacent the opening, and means connected to the flange member and inner wall portion rearwardly from the forward wall portion and defining, in combination with the flange member, inner wall portion and forward wall portion, a box-like reinforcement.

4. A combined window frame and decorative trim for an automobile body having a wall structure with an opening therein, and comprising a thin-wall member of cellulose organic acid ester material arranged to extend peripherally of the opening, and having an inner wall and a forward wall integral and merging therewith, said walls having integral decorative inner and forward surfaces, respectively, merging with each other, a separate reinforcing member having relatively angularly disposed portions, one of said portions being connected to and extending rearwardly from the forward wall portion and in spaced relation outwardly from said inner wall portion, said reinforcing member being arranged to lie within said opening with the outermost margin of the forward wall overlying the said wall structure adjacent the opening, the other portion of the reinforcing member being connected to the inner wall rearwardly from the forward wall and defining with the inner and forward walls and the other portion of the reinforcing member a box-like reinforcement.

5. A decorative trim molding for a wall structure having an opening, and comprising a thin-walled member of cellulose organic acid ester material and having integral forward and inner walls with forward and inner decorative surfaces, respectively, and having a portion with a rearwardly opening groove at the rear of said forward wall, a flange member having its forward margin seated in said groove, said flange member extending rearwardly of the forward wall in outwardly spaced relation to the said inner wall and defining with the walls of the first member a rearwardly open channel, and means connected to the rearward portion of the flange member and to the rearward portion of the inner wall and closing said channel and forming therewith a rigid box-like reinforcement adapted for reception within said opening.

6. A trim molding for a wall structure having an opening, comprising a molded, one-piece member of cellulose organic acid ester material having a peripherally closed portion, said portion having forward and inner walls with integral forward and inner decorative surfaces, and said molding having an outer flange portion extending rearwardly from the forward wall and spaced outwardly from the inner wall, relatively rigid reinforcement means connected to said flange portion and said inner wall and bridging the space therebetween and reinforcing the flange portion and the inner wall.

7. A trim molding for a wall structure having an opening and a window pane for said opening, said trim molding comprising a molded, one-piece member of cellulose organic acid ester material having a forward wall portion with a decorative forward face and an inner, integral wall portion extending rearwardly from the forward wall portion and having an inner decorative face, a flange member connected to the first member and extending rearwardly therefrom and spaced outwardly from the inner wall portion, a reinforcing strip of thermally moldable material bonded to the rear portions of said flange member and inner wall portion bridging the space therebetween and forming with the flange member and inner wall portion a reinforced structure of box-like section, a yieldable seal strip carried by said reinforcing strip and arranged for bearing against said pane when the trim molding is installed in the opening, and said trim member having portions arranged for engagement by connecting means for securing the trim molding in the opening.

8. A decorative trim molding for a vehicle wall window comprising a thin-walled member of cellulose organic acid ester material adapted to extend along a wall portion defining the window opening and having a decorative portion arranged to be exposed in the opening, and a portion of the said material arranged to face toward a window pane closing the opening, and a strip of soft, yieldable material carried directly on said last portion and intimately bonded thereto and arranged to engage one face of the pane when the decorative trim molding is installed, and said trim molding having portions arranged for connection with the wall structure for securing the trim molding in place, said last portions being positioned to be concealed when the trim member is in place.

9. A trim molding for a wall structure having an opening, comprising a member of thermally moldable material arranged to extend peripherally of the opening, and having a forward wall portion with a decorative forward face and an inner wall portion extending rearwardly from the forward wall portion, an integral outer flange member spaced outwardly from the inner wall and extending rearwardly from the forward wall, a reinforcing member bridging between the rearward marginal portions of said flange member and inner wall portion and forming with the flange member, the inner wall portion, and the forward wall portion, a reinforced structure of box-like section, openings in said outer flange member extending from a zone near the front wall rearwardly and terminating short of the rear marginal portions of said outer flange member for receiving and concealing attachment means to be associated with the molding for connecting it to said wall structure and within the opening.

10. A trim molding for a wall structure having an opening and comprising a one-piece peripherally closed member of thermoplastic material and having decorative characteristics throughout its full thickness and of generally U-shaped cross section and arranged to lie in the opening with the base of the U exposed forwardly, the forward surface of the U and the surface of one of the arms of the U exposed inwardly of the opening presenting a decorative face, a relatively rigid strip of thermoplastic material secured to the arms of the U and lying partially therebetween and forming with the arms and the base of the U substantially a closed O-frame section, and having its marginal portion inwardly overlapping the inner arm of the U adjacent the rearward margin of said inner arm.

11. A vehicle body window opening trim molding comprising a one-piece, peripherally enclosed member of cellulose organic acid ester material having forwardly and inwardly exposed decorative faces, and with decorative color characteristics extending throughout the entire thickness of the material.

JAMES S. REID.